United States Patent Office 2,882,174
Patented Apr. 14, 1959

2,882,174

ALUMINA RODS FOR COATING ARTICLES

Neil N. Ault, Holden, Mass., assignor to Norton Company, Worcester, Mass., a corporation of Massachusetts No Drawing. Application March 19, 1957
Serial No. 646,973

8 Claims. (Cl. 106—67)

The invention relates to alumina rods for coating articles by flame spraying.

One object of the invention is to obtain uniform coatings on articles by the flame spraying process described in U.S. Letters Patent No. 2,707,691 to W. M. Wheildon, Jr., patented May 3, 1955. Another object of the invention is to provide superior alumina rods for use in the process of the Wheildon patent. Another object is to provide rods which do not cause spitting.

Another object is to make rods for this flame spraying process which have greater thermal shock resistance. Another object is to make rods for flame spraying which will melt readily without spalling. Another object is to eliminate fracturing of such rods during flame spraying, previous rods having sometimes completely fractured resulting in the ejection of considerable lengths of white hot rods from the gun. These have burned people.

Other objects will be in part obvious or in part pointed out hereinafter.

I have discovered that a coarse grained rod sprays uniformly in the gun and is superior to a fine grained dense rod even though the strength of the fine grained dense rod is greater. For example, when a sintered aluminum oxide rod is made from fine aluminum oxide, extruded and fired to cone 35, a very strong, dense finely crystalline rod is obtained. Such a rod can be used for flame spraying but pieces of the rod which have not melted often break off and are projected by the compressed air blast onto the surface being coated. Such pieces may stick to the surface and cause a defect in the coating, or they may bounce off in which case they become hazards to people and property. The rate of feed of the rod and thus the spraying rate must also be kept low in order to use these dense rods. Even then this breaking off of pieces of rod (sometimes called spitting) will occur.

I have found that the use of coarse grained rods produced from coarse grained raw materials largely eliminates the hazards and produces better coatings. Rods made from a mixture containing coarse aluminum oxide such as 70 mesh grit size along with finer material, do not spit but spray uniformly.

The preferred formula for the aluminum oxide rods according to my invention is given in the following table:

TABLE I

| Material: | Percent by weight |
|---|---|
| Fused high purity aluminum oxide 70 grit size and finer (290 microns and finer) | 75 |
| Calcined aluminum oxide 325 grit size and finer (44 microns and finer) | 23.5 |
| Bentonite clay | 1.5 |

*Example I*

100 weight parts of the material of Table I is mixed with 17 weight parts of water, 1 weight part of dextrine, and 2 weight parts of corn starch. After thorough mixing the resultant mixture is extruded thus forming rods. At present the rods are, after firing for which an allowance of 4% of the diameter is made for shrinkage, either one eighth of an inch in diameter or three sixteenths of an inch in diameter. The rods are then dried and after drying they are fired to cone 35, that is to say by placing them in a cone 35 kiln and thereby giving them the cone 35 heat treatment. Within the scope of my invention the firing could be anywhere from cone 20 to cone 42. The rods are then ready to be used in the process of the Wheildon patent.

Another formula which can be used in accordance with my invention is:

TABLE II

| Material: | Percent by weight |
|---|---|
| Calcined tabular alumina 60 grit size and finer (400 microns and finer) | 60 |
| Calcined alumina 325 grit size and finer (44 microns and finer) | 38 |
| Bentonite clay | 2 |

*Example II*

100 weight parts of the material of Table II are mixed with 17 parts of water, 1 weight part of dextrine, and 2 weight parts of corn starch. The remainder of the procedure is the same as for Example I, except that an allowance of 5% is made for diametrical firing shrinkage.

Another formula which can be used in accordance with my invention is:

TABLE III

| Material: | Percent by weight |
|---|---|
| Fused aluminum oxide 70 grit size and finer (290 microns and finer) | 60 |
| Calcined alumina 325 mesh and finer (44 microns and finer) | 25 |
| Ball clay | 5 |
| Wollastonite | 2 |
| Talc | 8 |

*Example III*

100 weight parts of the mixture of Table III are mixed with 2 weight parts of corn starch, 1 weight part of dextrine and 13 weight parts of water. After thorough mixing the resultant mixture is extruded to form rods. The rods are then dried and fired. Since this composition contains 15 weight percent of materials which form a glass in firing and bond the alumina grains together, the rods can be fired to lower temperatures than those given in Examples I and II. When the rods were fired to cone 16, they were of satisfactory quality.

In accordance with my invention another method for producing rods of the desired characteristics is to include a material in the mixture which will burnout and leave pores in the rod where the material has burned out. Such material can be sawdust, nut shells, coffee, or organic resins. Pores can also be introduced by materials which sublimate such as paradichlorobenzene. With the pores artificially introduced in this manner, the size of the alumina powder used can be similar to that of my preferred composition or it can be a very fine powder. Such a formula for producing a porous rod with fine alumina powder is given in the following table:

TABLE IV

| Material: | Percent by weight |
|---|---|
| Calcined alumina with an average particle size of 2 to 3 microns | 84.5 |
| Bentonite clay | 1.5 |
| Nut shells 175 to 225 microns | 14 |

Example IV 100 weight parts of Table IV are mixed with 22 parts of water, 1 weight part of dextrine and 2 weight parts of corn starch. After mixing, the resultant mixture is extruded into rods. The rods are dried and fired to cone 35. An allowance of 17% is made for diametrical firing shrinkage. The rods are then ready to be used for flame spraying.

In Example III the ball clay, the wollastonite and the talc become vitrified bond of glassy phase. Within the scope of my invention I can have from 50% to 96% by weight of aluminum oxide if it is bonded with a glassy phase of vitrified bond, this being one kind of rod in accordance with my invention. The other kind of rod in accordance with my invention is a sintered rod, and in this case the rod should contain at least 95% by weight of aluminum oxide. The rods of Examples I, II and IV are sintered rods. In any event there should be from 8% to 40% of open and interconnecting pores and that was the case in all of the examples. In all cases more than 50 volume percent of the pores of the rod should be more than 20 microns in diameter with less than 10 percent more than 250 microns in diameter.

In the examples the porosity of the rods, of open and interconnecting pores referred to as apparent porosity was, and the volume percentage of the pores more than 20 microns in diameter and more than 250 microns in diameter were about as follows:

TABLE V

| Example | Apparent Porosity, Percent | Pores More Than 20 Microns, Percent | Pores More Than 250 Microns, Percent | Typical Modulus of Rupture, p.s.i. |
|---|---|---|---|---|
| I | 28 | 70 | Less than 1 | 18,000 |
| II | 25 | 85 | 5 | 15,000 |
| III | 21 | 95 | 2 | 16,000 |
| IV | 33 | 99 | Less than 1 | 12,000 |

In all cases the rods should have a modulus of rupture of more than 2,000 pounds per square inch. For the best results according to the invention at least 30% by weight of the aluminum oxide particles should be coarser than 100 microns with substantially all of them finer than 500 microns.

It will thus be seen that there has been provided by this invention alumina rods for coating articles by flame spraying in which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:
1. A sintered aluminum oxide rod for flame spraying to coat articles with aluminum oxide having a porosity of from 8% to 40% of open and interconnecting pores and having a modulus of rupture of more than 2,000 pounds per square inch, said rod containing at least 95 weight percent of aluminum oxide.

2. A sintered aluminum oxide rod for flame spraying to coat articles with aluminum oxide according to claim 1 in which at least 30% by weight of the aluminum oxide particles are coarser than 100 microns and substantially all of them are finer than 500 microns.

3. A sintered aluminum oxide rod for flame spraying to coat articles with aluminum oxide according to claim 2, in which more than 50 volume percent of the pores of said rod are more than 20 microns in diameter.

4. A sintered aluminum oxide rod for flame spraying to coat articles with aluminum oxide according to claim 1, in which more than 50 volume percent of the pores of said rod are more than 20 microns in diameter.

5. A bonded aluminum oxide rod for flame spraying to coat articles with aluminum oxide having a porosity of from 8% to 40% of open and interconnecting pores and having a modulus of rupture of more than 2,000 pounds per square inch, said rod containing from 50 to 96 weight percent of aluminum oxide bonded together by a glassy phase of vitrified bond.

6. A bonded aluminum oxide rod for flame spraying to coat articles with aluminum oxide according to claim 5 in which at least 30% by weight of the aluminum oxide particles are coarser than 100 microns and substantially all of them are finer than 500 microns.

7. A bonded aluminum oxide rod for flame spraying to coat articles with aluminum oxide according to claim 6, in which more than 50 volume percent of the pores of said rod are more than 20 microns in diameter.

8. A bonded aluminum oxide rod for flame spraying to coat articles with aluminum oxide according to claim 5, in which more than 50 volume percent of the pores of said rod are more than 20 microns in diameter.

References Cited in the file of this patent

UNITED STATES PATENTS

| | | |
|---|---|---|
| 1,870,437 | Barnitt et al. | Aug. 9, 1932 |
| 2,629,161 | Kistler | Feb. 24, 1953 |
| 2,707,691 | Wheildon | May 3, 1955 |